UNITED STATES PATENT OFFICE.

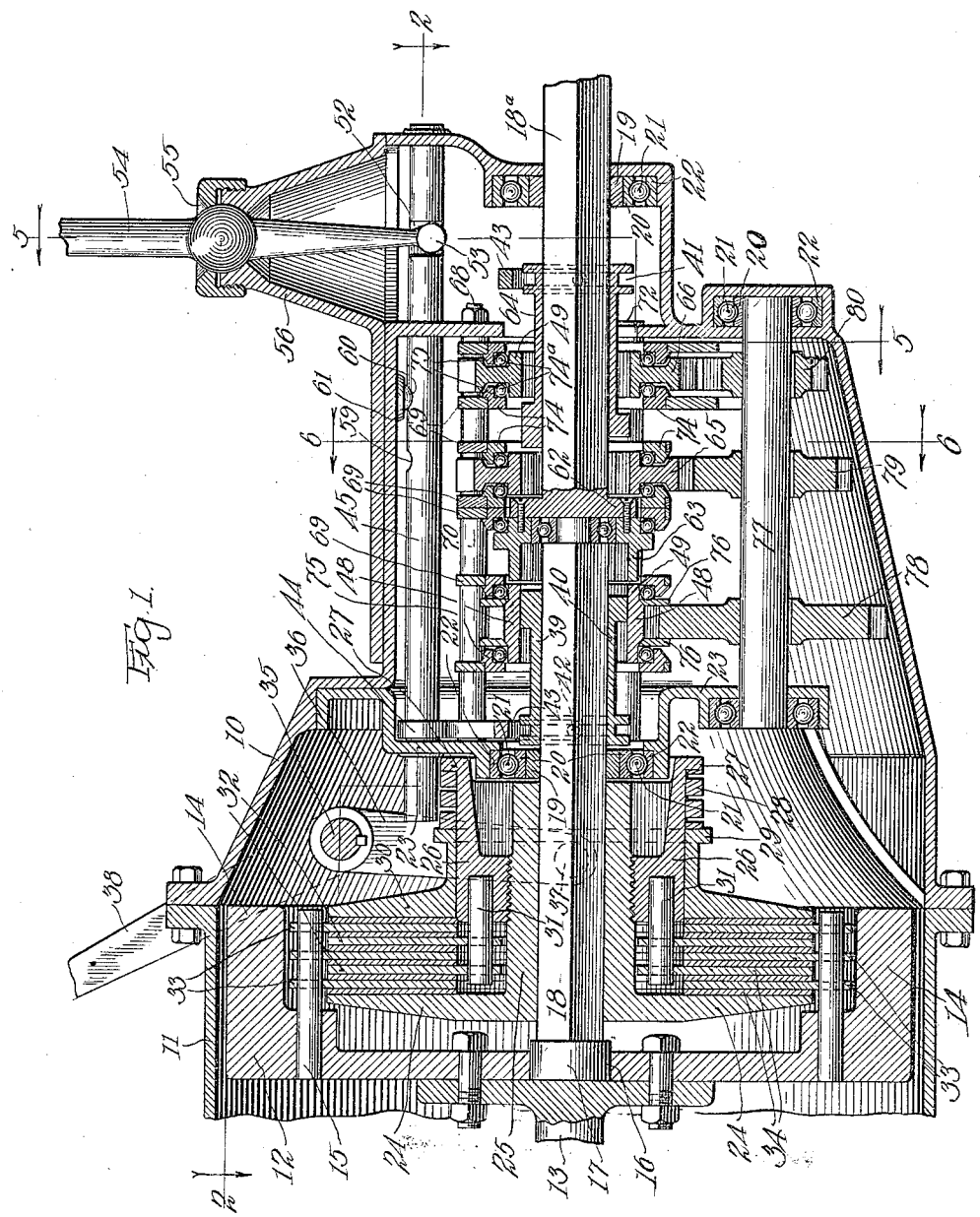

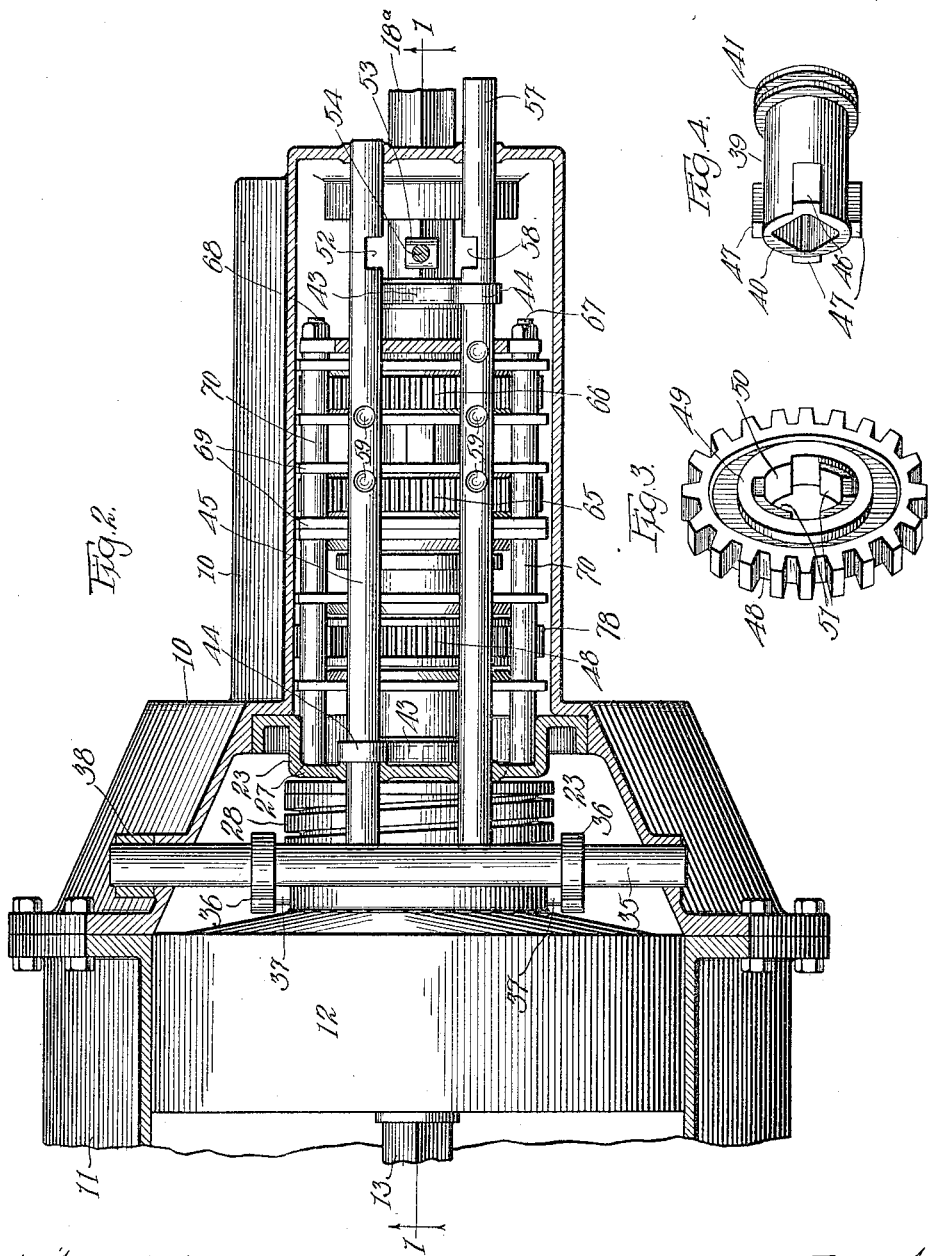

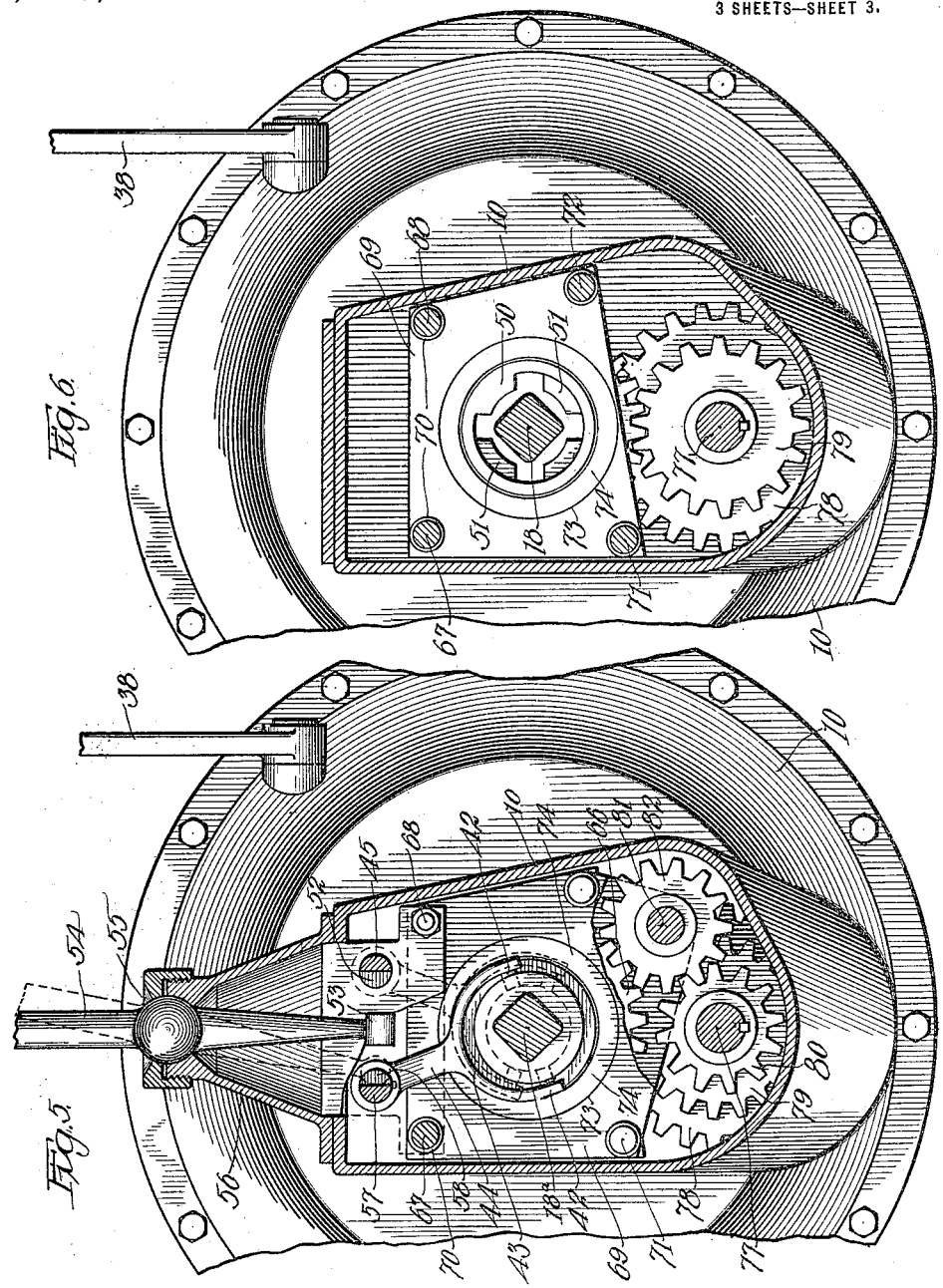

JOHN E. BECKMAN, OF CHICAGO, ILLINOIS.

POWER-TRANSMISSION GEARING.

1,193,662.  Specification of Letters Patent.  Patented Aug. 8, 1916.

Application filed January 13, 1915. Serial No. 1,913.

*To all whom it may concern:*

Be it known that I, JOHN E. BECKMAN, a citizen of the United States, residing at the city of Chicago, in the county of Cook and State of Illinois, have invented certain new and useful Improvements in Power-Transmission Gearing, of which the following is a specification.

This invention relates to certain new and useful improvements in power transmitting mechanism or gearing, and has particular relation to such mechanism or gearing designed for use on or in connection with automobiles for changing the speed thereof, and it consists in certain new features of construction and novel combinations, arrangements, and operation of devices and mechanisms as will be hereinafter more fully set forth and specifically claimed.

The principal object of the invention is to provide a power transmitting gearing of such construction and arrangement of its parts that changes of speed may be readily effected thereby, while the gears thereof will always be maintained in mesh, thus obviating the necessity of sliding or shifting certain of the gears into and out of mesh with others, as has heretofore generally been done in transmission gearing of the common kind, which shifting operation is objectionable on account of the clashing of the gear-teeth and the deleterious effect on the mechanism, and for other reasons, well known to those skilled in the art.

Another object of the invention is to provide a transmission gearing in which all of the gears thereof lie idle or non-rotative while driving through the direct drive instrumentalities.

A further object is to furnish improved clutch or engaging means for operatively securing the gears to their respective shafts and for disconnecting them from the same when desired.

Still another object is to supply improved hangers and bearings for the gears which surround the driven shafts, to the end that said gears and said shafts may, at times, be rotated independently of one another.

Other objects and advantages of the invention will be disclosed in the subjoined description and explanation.

In the drawings, which serve to illustrate the invention—Figure 1 is a central and vertical sectional view through the gearing and its casing, taken on line 1—1 of Fig. 2, looking in the direction indicated by the arrows, and showing the parts in their neutral positions; Fig. 2 is a plan view partly in section taken on line 2—2 of Fig. 1; Fig. 3 is a detached perspective view of one of the clutch gears or pinions of the driven shafts; Fig. 4 is a detached perspective view of one of the splined clutch members of said shafts; Fig. 5 is a cross sectional view taken on line 5—5 of Fig. 1, looking in the direction indicated by the arrows, and Fig. 6 is a similar view taken on line 6—6 of Fig. 1, looking in the direction indicated by the arrows.

Like numerals of reference refer to corresponding parts throughout the different views of the drawing.

The gear casing as a whole is indicated by the reference numeral 10, and may be of any suitable size, form and material, but preferably of metal and the shape shown in the different views of the drawings. At its front end the casing 10 has secured thereto a housing 11 for the master or fly wheel 12, which is rigidly mounted on a crank or driving shaft 13 of the ordinary or any preferred kind, which shaft may be driven in any suitable manner. As is clearly shown in Fig. 1, the wheel 12 has an overhanging periphery 14, which extends forwardly or toward the gear casing 10, and said wheel is provided with a plurality of pins 15, which extend forwardly and at a slight distance from the inner surface of the periphery 14, for the purpose to be presently explained. Centrally the wheel 12 is provided with an opening 16, in which is fitted a collar or ring of phosphor-bronze 17, in which the rear end of one section 18 of the driven shaft is journaled, the other end of said shaft being extended forwardly and horizontally within the casing 10 to about the longitudinal middle of the same. The shaft 18 is by preference angular in cross section and has secured therearound at about its middle a collar 19, or bearing, which is circular on its outer surface and has fitted therearound a ring or band 20, provided on its outer surface with a circumferential groove to receive anti-friction balls 21, which are retained in position by means of a ring or band 22, surrounding said balls and seated in a suitable opening in a depending portion or partition 23 of the casing. Mounted on the shaft 18, between the wheel 12 and partition 23 of the casing is a multiple diskclutch, which consists of a main disk or wheel 24, having a forwardly extended hub 25, mounted on the shaft 18, and provided with external screw threads. Surrounding the hub 25 and engaging the screw threads thereof is a collar 26, which has at its rear end an annular flange 27, against which a spring 28, coiled around said collar, rests at one end, the other end of which rests against the inner surface of an annular flange 29, on the hub of the inner disk 30 of the diskclutch, which hub and disk are slidably mounted on the collar 26, and are actuated by said spring. Extended from that portion of the hub 26, adjacent to the disk 24 are a number of pins 31, on which are secured a number of disks 32, which surround the hub 25 and are spaced apart. Secured on the pins or rods 15 are a number of spaced apart disks 33, which are provided centrally with openings of sufficient size to encompass the collar 26, or to allow the same to be slid into said openings. Interposed between the disks or plates 32 and 33 and between the latter and the disks 24 and 30 are disks 34 of fiber or other suitable material.

Transversely and horizontally journaled in the upper part of the front portion of the casing is a rock shaft 35, on which are secured at their upper ends a pair of arms 36, which extend downwardly on each side of the hub of the inner disk 30, and each of said arms is by preference provided at its lower end with an inwardly extended projection 37, to engage the flange 29 on said hub. Rigidly secured at one of its ends to the shaft 35 is a lever 38, which may be extended upwardly through the floor of the automobile and provided with a pedal (not shown) for the foot of the operator, if desired. By pressing downwardly on the lever 38 it is apparent that the inner disk 30 will be moved rearwardly against the tension of the spring 28, thus throwing the parts out of clutch or engagement.

Slidably mounted on the shaft section 18, rearwardly of its rear bearing is a splined male clutch member, which is designated as a whole by the reference numeral 39, and consists of a body 40, having an opening therein to receive the shaft 18, which opening by preference corresponds in shape to the cross sectional contour of said shaft, but if desired the body 40 may be keyed to said shaft so as to be slid therein, yet rotated therewith. At one of its ends the body 40 of the clutch member is provided with a circumferential groove 41, for the reception and operation of projections 42 on a yoke 43, which yoke has an upwardly extended arm 44, secured to a shifting rod 45, near the rear end thereof. At suitable points on its outer surface the body 40 of the male clutch member is provided with a plurality of splines or teeth 46 and 47, the spline 46 having one of its ends flush with the adjacent end of the body 40, while the splines 47 are set back at a distance from said end of the body. Surrounding the clutch member 39 is a female or gear clutch member, which consists of a gear 48, having a central opening of sufficient size to receive the body 40 of the clutch member 39, and provided on each of its faces around said opening with an annular flange 49, which constitute the hub of said gear. Extended inwardly from the inner surface of the hub 49 of the member 48, are a series of spaced apart teeth 50 and 51, the latter being set in or located at a distance at their outer edges from at least the face of one of the flanges 49, while the tooth 50 is flush at one of its outer surfaces with at least one of said faces. Thus it will be seen that by spacing the teeth 51 from the face or faces of the hub flange or clutches 49 of the gear 48, and by spacing the splines or teeth 47 from the end of the member 40, and forming the tooth 50 with its face or faces flush with the hub flange 49 and the spline 46, with its end adjacent to the end of the member 40 flush therewith, engagement of the clutch members can be readily and positively effected, when desired, by sliding the male member 39 in the proper direction on the shaft 18, which supports the same. The sliding or shifting rod or shaft 45, is mounted for longitudinal movement in the upper rear portion of the casing 10, and is provided on its inner surface near its rear end with a recess 52, for the reception of a projection 53, on the lower end of a controlling lever 54, which is provided with a universal or ball and socket bearing 55 in the upper portion of an upright 56, on the rear portion of the casing.

Mounted on the casing and in parallelism with the shaft 45 is another shaft 57, which has in its inner surface near its rear end a recess 58 to receive the projection on the controlling lever. Each of the shafts 45 and 57 is provided with depressions 59 on their upper surfaces for the reception of spring pressed balls 60, carried by cups 61, secured to the lower surface of the top of the casing, said balls being employed to prevent accidental dislocation of the rods 45 and 57, yet to permit them to be readily reciprocated when desired. Journaled in the rear end of the casing in alinement with the shaft 18 is an auxiliary shaft 18$^a$ which is connected at its rear end to the rear axle of the machine or the part to be driven, by any suitable means. The forward end of the shaft 18$^a$ is provided with an annular flange 62 to the front surface of which is secured the direct drive female clutch member 63, which surrounds the rear portion of the shaft 18, and is substantially of the same construction as the gear 48, illustrated in Fig. 3, and above described, except that the gear teeth are omitted therefrom. At its bearing in the casing 10, the shaft 18ª is equipped with anti-friction bearing devices of similar construction to that shown in Fig. 1, for the middle portion of the shaft 18, and above described. Slidably mounted on the shaft 18ª is a splined male clutch member 64, which is of the same construction as that shown in Fig. 4, and above described, but it will be noted that the grooved portion of the member 40 is located rearwardly of the splined end thereof, or reversely from the position of the clutch member 39, which is mounted on the shaft 18, as above explained. A yoke 43, of similar construction to the yoke 43, employed for operating the clutch member 39, is employed to engage the clutch member 64, and is connected by means of an arm 44 to the shaft 57, forwardly of the recess 58 therein. Surrounding the front portion of the shaft 18ª are a pair of gears 65 and 66, which are of substantially the same construction as the gear 48, except that they are by preference of less thickness and somewhat greater in diameter than said gear. The central opening in each of the gears 65 and 66 is of sufficient size to receive the body 40 of the clutch member 64, and each of said gears is provided with teeth 50 and 51 of the same construction and arrangement as those on the gear 48 (see Fig. 3 of the drawings).

The gears 48, 65 and 66 are supported in a novel manner and are furnished with bearings of such construction that will cause them to operate in an even or uniform and noiseless manner. In accomplishing this a pair of rods 67 and 68 are horizontally and longitudinally supported on the casing and within the same in parallelism with one another. Mounted on these rods 67 and 68 and depending therefrom are a series of hanger plates 69, which are provided with suitable openings in their upper portions to receive the rods 67 and 68, and said plates are held in spaced relation to one another by means of sleeves 70, fitted on said rods. The lower portions of the hanger plates 69 are likewise supported by horizontally and longitudinally extended rods 71 and 72, extended through suitable openings in the plates 69 and supported at their ends on the gear casing. Each of the plates 69, is provided with an opening 73, and one of said plates is located on each side of each of the gears 48, 65 and 66; or, in other words, are arranged in spaced apart pairs to permit a gear to be placed between the members of each pair. Fitted in the opening 73 of each of the plates 69 is a ring 74, each of which has an annular flange 75 on its surface adjacent to the gear which it surrounds. These flanges are of greater diameter than the hubs 49 of the gears so as to permit of the insertion and retention of anti-friction balls 74ª between the rings 74, their flanges 75, and the hubs 49 and webs of the gears. Each of the rings 74 and its flange is so made that when positioned in its respective hanger plate the flange will project toward the gear which said hanger plate supports, and will prevent lateral dislocation of the ring, as it is obvious that said rings and flanges will have a tendency to be thrust away from the gears by reason of the action of the anti-friction balls 74ª and rotation of said gears. In the bearing for the gear 48 a supplemental plate 76 is located on each side of the teeth of the gear 48, against which the balls 74ª will be pressed by the rings 74 and flanges 75 thereof, and these supplemental plates will prevent engagement of the balls with said teeth, and also dispense with noise. The female clutch member or direct drive clutch 63, is also provided at its rear portion with a flanged ring 74, carried by a hanger plate 69, but said plate is omitted from the front part of said clutch.

Horizontally and longitudinally journaled within and on the lower portion of the casing 10, is a jack shaft 77, which is equipped at its bearing points with anti-friction bearing devices 20, 21 and 22 of substantially the same construction as the bearings for the shafts 18 and 18ª, and above described. Keyed to the shaft 77 at suitable points to mesh with the gears 48, 65 and 66 respectively, are gears or pinions 78, 79 and 80. Journaled in the rear portion of the casing to one side of the shaft 77 is a stub shaft 81, on which is mounted an intermediate gear 82, which meshes with the gears 66 and 80 and is employed in the reverse drive of the machine.

From the foregoing and by reference to the drawings, it will be readily understood and clearly seen that, assuming the parts to be in the positions indicated in Figs. 1 and 2 of the drawings, and that the multiple disk-clutch is in clutch engagement with the master wheel 12, it is apparent that the shaft 18 will be driven by the rotation of the wheel 12, and its shafts, while the auxiliary shaft 18ª will remain stationary. In the operation of the parts as they are positioned in Figs. 1 and 2, all of the gears of the mechanism will be rotated, but idly or without performing any driving function. Now if it is desired to place the parts in position for low speed forward driving, the controlling lever is manipulated so as to place the projection 53 on the lower end thereof, into the recess 58 of the shaft 57, when by throwing the lever 54 rearwardly, it is obvious that the clutch member 64, will be thrown into engagement with the gear 65, thus causing power to be transmitted to the shaft 18ª and through the instrumentality of the same to the rear axle of the automobile, or to the part to be driven. For direct high speed driving, the shaft 57, should be returned by the proper manipulation of the controlling lever 54, to the position indicated in Fig. 2, when, by placing the projection 53 on the controlling lever in the recess 52, of the shaft 45, and throwing the lever forwardly, it is obvious that the clutch member 39 will be slid rearwardly into engagement with the direct drive clutch member 63, which, as before stated, is rigidly connected to the shaft 18ª, and will thus transmit power to the rear axle of the automobile, or part to be driven. In order to reverse the drive, the shaft 45 should be restored to its normal position, as shown in Fig. 2, when, by again placing the projection 53 of the controlling shaft 54, in engagement with the recess 58, of the shaft 57, and throwing said lever forwardly, it is obvious that the clutch member 64, will be placed in clutch engagement with the gear clutch 66, and thus through said gear the intermediate gear 82 and the gear 80 impart reverse drive movement to the machine.

It is apparent that in carrying out my invention, various changes from the construction herein shown and described may be made, and that any number of gears may be employed, and I would therefore have it understood that I do not limit myself to the precise forms shown, but that such changes and alterations as fairly fall within the scope of the invention may be made without departing from the spirit thereof.

Having thus fully described my invention what I claim as new and desire to secure by Letters Patent is—

1. In a power transmission gearing, the combination with a driving shaft, of a main driven shaft and an auxiliary driven shaft, a jack shaft in parallelism therewith, gears fixed to the jack shaft, gears having internal clutching means and surrounding the driven shafts and in mesh with the gears on the jack shaft but capable of independent rotation with respect to the driven shafts, bearings independent of said shafts for the clutch-gears, a male clutch member slidably mounted on each of the driven shafts, and means to shift said members into and out of engagement with the clutching means of the last named gears.

2. In a power transmission gearing, the combination with a driving shaft, of a main driven shaft and an auxiliary driven shaft alined therewith, a female clutch member mounted on the end of the auxiliary shaft adjacent to the main driven shaft, a jack shaft journaled in parallelism with the driven shafts, gears fixed to the jack shaft, gears having internal clutching means and surrounding the driven shafts and in mesh with the gears on the jack shaft but capable of independent rotation with respect to the driven shafts, said clutch-gears having their bearings independent of said shafts, a male clutch member slidably mounted on each of the driven shafts and having means to engage the internal clutching means of said gears and the clutching means of said female clutch member, and means to shift said members into and out of engagement with said clutching means.

3. In a power transmission gearing, the combination with a driving shaft, of a main driven shaft, clutch engaging means coöperating with said shafts, an auxiliary driven shaft, a jack shaft journaled in parallelism therewith, gears fixed to the jack shaft, internally splined gears surrounding the driven shafts and in mesh with the gears on the jack shaft but capable of independent rotation with respect to the driven shafts, bearings independent of said shafts for the splined gears, a male clutch member slidably mounted on each of the driven shafts and having external splines to engage the splines of said gears, and means to shift said members into and out of engagement with the splines of the last named gears.

4. In a power transmission gearing, the combination with a driving shaft, of a main driven shaft, clutch engaging means coöperatively connecting said shafts, an auxiliary driven shaft, a jack shaft journaled in parallelism therewith, gears fixed to the jack shaft, internally splined gears surrounding the driven shafts and in mesh with the gears on the jack shaft but capable of independent rotation with respect to the driven shafts, bearings independent of said shaft for the splined gears, one of the splines of each of said gears being flush with one of the faces thereof and the other of said splines being located with their ends at a distance from the faces of the gears, a male clutch member slidably mounted on each of the driven shafts and having external splines to engage the splines of said gears, one of the splines on each of the male members being flush with its end and the other splines thereon being located at a distance from the end thereof, and means to shift said members into and out of engagement with the splines of the last named gears.

5. In a power transmission gearing, the combination with a driving shaft, of a main driven shaft and an auxiliary driven shaft alined therewith, a female clutch member mounted on the end of the auxiliary shaft adjacent to the main driven shaft, one of the splines of said member being flush with the front end thereof and the other of said splines being located with their forward ends at a distance from the forward end of said member, a jack shaft journaled in parallelism with said driven shafts, gears fixed to the jack shaft, internally splined gears surrounding the driven shafts and in mesh with the gears on the jack shaft but capable of independent rotation with respect to the driven shafts, bearings independent of said shafts for the splined gears, one of the splines of each of said gears being flush with one of the faces thereof, and the other of said splines being located with their ends at a distance from the corresponding faces of the gears, a male clutch member slidably mounted on each of the driven shafts and having external splines to engage the splines of said gears and of said female clutch member, one of the splines of each of the male members being flush with its end and the other splines thereon being located at a distance from the end thereof, and means to shift said members into and out of engagement with the splines of the last named gears and with said female clutch member.

6. In a power transmission gearing, the combination with a gear casing, of a driven shaft mounted therein, a gear having internal clutching means and surrounding the driven shaft, a hanger plate surrounding said shaft and suitably supported within the casing at each side of the gear, an internally flanged ring fitted in an opening in each of said plates and circumscribing the hub of the gear at each end thereof, anti-friction balls interposed between the flanged rings and the hub of the gear, a male clutch member slidably mounted on said shaft and adapted to engage internally the clutching means of said gear, means to shift said member into and out of engagement therewith, an auxiliary driven shaft alined with the first named driven shaft, and gearing in engagement with the said gear having the internal clutching means and means for operatively connecting and disconnecting said gearing with the auxiliary shaft.

7. In a power transmission gearing, the combination with a gear casing, of a main driven shaft journaled in the casing, a jack shaft journaled in parallelism with said driven shafts, a gear on the jack shaft, a gear having internal clutching means and a hub surrounding the main driven shaft, a pair of suitably supported apertured hangers surrounding the main driven shaft and circumscribing the hub of the gear therein one at each end of said hub, an internally flanged ring fitted in the opening of each of said hangers, anti-friction balls interposed between the flanged rings and the hub of the gear, a male clutch member slidably mounted on the main driven shaft and having external means to engage the clutching means of the gear thereon, and means to shift said member into and out of engagement therewith.

8. In a power transmission gearing, the combination with a driving shaft, of a main driven shaft and an auxiliary driven shaft alined therewith, a female clutch member mounted on the end of the auxiliary shaft adjacent to the main driven shaft and having internal splines, one of the splines of said member being flush with the front end thereof and the other of said splines being located with their forward ends at a distance from the forward end of said member, a jack shaft journaled in parallelism with said driven shafts, gears fixed to the jack shaft, a stub shaft located near the jack shaft, an intermediate gear in mesh with one of the gears on the jack shaft, internally splined gears surrounding the driven shafts and a pair of said gears in mesh with a pair of the gears on the jack shaft, one of said gears surrounding the auxiliary shaft being in mesh with the intermediate gear, one of the splines of each of said splined gears being flush with one of the faces thereof and the other of said splines being located with their ends at a distance from the corresponding faces of the gears, a male clutch member slidably mounted on each of the driven shafts and having external splines to engage the splines of said splined gears and of said female clutch member, one of the splines of each of the male members being flush with its end and the other spline thereon being located at a distance from the end thereof, and means to shift said members into and out of engagement with the splines of the last named gears and with said female clutch member.

JOHN E. BECKMAN.

Witnesses:
  CHAS. C. TILLMAN,
  A. S. PHILLIPS.

Copies of this patent may be obtained for five cents each, by addressing the "Commissioner of Patents, Washington, D. C."